Dec. 9, 1941.                R. GEBAUER                2,265,966
                           AIRCRAFT ALTIMETER
                          Filed Aug. 11, 1939
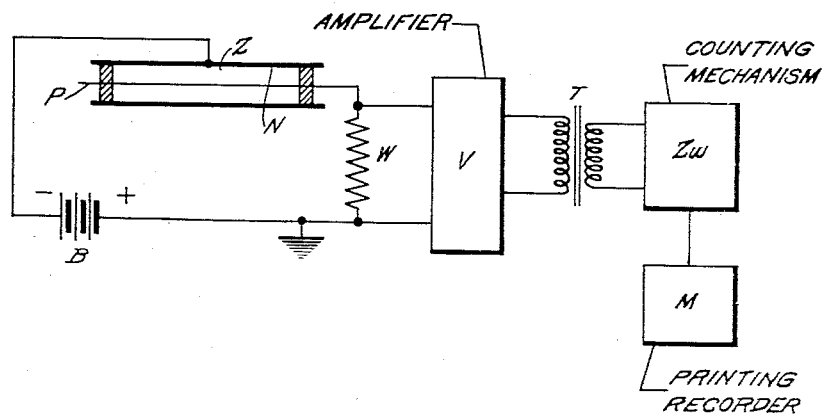
                                              INVENTOR.
                                         RUDOLPH GEBAUER
                            BY
                              ATTORNEY Patented Dec. 9, 1941

2,265,966

UNITED STATES PATENT OFFICE 2,265,966

AIRCRAFT ALTIMETER

Rudolf Gebauer, Berlin, Germany, assignor to C. Lorenz Aktiengesellschaft, Berlin-Tempelhof Germany, a company Application August 11, 1939, Serial No. 289,688
In Germany August 12, 1938

4 Claims. (Cl. 250—1)

For the determination of the altitude of an airplane from the craft itself every property of nature can be used which according to some law varies with altitude. Up to the present time airplane altimeters have generally operated according to the exponential decrease in air pressure with altitude (barometer type).

It will become evident from the disclosed invention that cosmic radiation for the purpose of altitude measurements has a practical aspect.

It is known that the earth continually receives from the cosmos an unusual penetrating radiation, known as Millikan or cosmic rays the cosmic rays which penetrate the earth's atmosphere are essentially corpuscular in nature. Corpuscular rays are cosmic rays of great power which are able to split up molecules of some gas of low pressure into ions. For a more complete discussion of these rays and their effect reference is made to the publication entitled "Ergebnisse der exakten Naturwissenschaften" vol. 13, (Verlag Sprinter, Berlin) (Results of exact natural science). In the passage of these individual rays through the earth's atmosphere a change takes place in the nature of the primary rays, which are essentially corpuscular in nature with a wave-radiation basis, and causes the formation of secondary rays with the result that, as far as cosmic radiation to the earth's surface and in the atmosphere is concerned, we are not affected by a single constant-speed or monochromatic wave radiation, but by a complicated mixture of primary and secondary rays. This becomes apparent very soon in studying such a mixture of rays, since more of the more penetrating cosmic rays are observed to pass through a given medium, the thicker or more dense that medium. The softest or the slowest particles are first stopped or separated, so that only the last penetrating rays can be observed under great water beds or in mines. Such experiments show that parts of cosmic ray radiation are associated with unusually great energy. It has been proved that some particles possess energy of the order of $10^{10}$ e.-volts.

The change in form of these cosmic ray particles with the earth's atmosphere results in changes in the conductivity of the air, and facts concerning such a change may furnish helpful information. For instance, the Geiger-Müller tube is an ideal instrument for determining the quality of individual cosmic rays. The physical process which takes place in such a tube in getting information as to cosmic ray particles is given in the following purely qualitative description: A cosmic ray particle which has penetrated into the gas chamber of such a tube produces ions (the paths of which are on the order to 10 centimeters). The electrodes of this tube are provided (control wires inside) with enough voltage to give the produced ions themselves a high speed so that they can produce new ions. An avalanche of ions is thus set up, of which a large number carry a charge and an accordingly larger current source through the tube. This phenomenon can be regarded as an electrical breakdown ignited by cosmic rays.

The instrument, with which cosmic radiation is detected and by which for the first time their intensity increase with altitude is to be determined, is called the ionization chamber. Such a chamber is nothing more than a system including insulated positively and negatively charged surfaces, which indicate a certain conductivity of the air between each other when influenced by any X-ray, radioactive, or air conducting radiation means.

Regener and his collaborators have developed a means of measuring cosmic radiation intensity up to the greatest altitudes. They succeeded up 28 km. in the stratosphere by sending up self-recording apparatus using a Geiger-Müller tube. As an interesting comment, the intensity records as determined from a great number of such ascents show that cosmic radiation intensity is constant above 20 km. and falls off with the lower altitudes. Some of the determined values are as follows: at sea level the intensity is 2 ion pairs/cm.$^3$/sec., at 3 km. 10 ion pairs, at 4 km. 16, at 5 km. 25, at 6 km. 36, at 7 km. 50, at 8 km. 66, at 9 km. 85, at 10 km. 107, at 12 km. 152, at 14 km. 206, at 16 km. 260, at 18 km. 300, and the maximum intensity at 20 km. of about 320 ion pairs/cm.$^3$/sec. The appearance of the intensity curve for cosmic radiation shows clearly that a secondary radiation occurs in the air. The number of cosmic rays entering the earth's atmosphere is therefore lower than the number of particles indicated at the maximum of the curve. The number of secondary particles increases to a certain concentration, at which point the mean penetratability of the secondary particles is reached, and a balance is found between the newly produced and absorbed secondary particles.

The purpose of the invention is to use cosmic radiation intensity, which has been shown dependent upon altitude, to determine altitude from an airplane. According to the above described intensity curve, this purpose can only be realized to altitudes of 20 km. The invention proposes that this measurement be made automatically and continuously. From the relation between intensity and altitude a direct altitude reading may be taken. With modern means employing greater precision cosmic radiation can be measured independent of air pressure and other natural phenomena, so that an advantage is at once realized over the barometer type of altimeter. Furthermore, at greater altitudes, cosmic ray intensity variation with elevation is relatively greater than that of air pressure, and naturally a cosmic ray measuring device is not only more free from disturbances but also more sensitive. With this in mind the cosmic ray meter marks a definite technical step forward in altitude determination for aircraft.

My invention will be more readily understood when considered in the light of the following description and drawing, which shows schematically the principle of the cosmic raay altitude meter. In the figure, the negative and positive poles of a voltage source B are connected respectively to the sheath and control wire of the Geiger-Müller tube Z. For an internal tube pressure of 7 cm. Hg about 1400 volts are needed. According to the succession of events each cosmic ray penetrating the tube produces a current surge. The voltage which is produced thereby in the resistance W is applied across the input 2 amplifier V. The amplified impulse may, for example, be fed into the input transformer T of a counting mechanism Zw. This counting mechanism may be of any known form, for example, a stepping mechanism similar to switches used in telephony but with more stepping contacts. To determine the rate, or number per minute (intensity), the said mechanism must be observed continuously for equal time intervals, say every one minute. To make static variation effects as small as possible it might perhaps be better, in the case of the lower intensities, either to choose the time interval longer or to enlarge the scope or volume to be counted. The reading of totals can be visually accomplished from a reading of the counting mechanism, but it is a technical necessity that this be done automatically by showing the quantity per minute over several intervals. This can be accomplished as follows: A device M is provided so that at the end of each time interval (min.) the quantity which has been recorded in this period is printed on a moving strip of paper, at which instant the counting mechanism is automatically set back to zero, and so on for another cycle of operations. The details of the device M are of no importance in this particular invention. This mechanism may be of any known form such as is used for supervising several circuits for a power station, for example. Incidentally, the time required for setting the meter back to zero is small when comared to an entire recording interval.

Knowing the measured quantity per minute, which is a direct value of intensity, and the relation between the quantity per minute and altitude, the latter can be directly determined. The quantity per minute is only one of the magnitudes affecting the tube; others include nature of construction material, volume, shielding, and so forth, so that it is first necessary for the apparatus to be calibrated. For this purpose a common Geiger-Müller tube has to be developed, and therewith the relation between the quantity per minute and altitude determined. From this normal tube naturally more calibrations could be made in the laboratory.

What is claimed is:

1. An arrangement for determining the altitude of an airplane from the craft itself comprising an ionization chamber for producing a voltage in response to variations in cosmic ray intensity, and means responsive to said voltage utilizing the known relation between cosmic ray intensity and altitude for indicating altitude determinations.

2. An arrangement as set forth in claim 1 in which the said ionization chamber is a Geiger-Müller tube.

3. An arrangement for determining the altitude of an airplane from the craft itself comprising an instrument capable of response to variations in cosmic ray intensity, means utilizing the known relation between cosmic ray intensity and altitude for making altitude determinations, means for automatically recording said altitude determinations comprising means for printing the automatic records obtained from said determination upon a continuously moving strip of paper after every predetermined time interval, and means for resetting the recording mechanism back to zero within an interval, small in comparison with said predetermined time interval.

4. An apparatus for determining the altitude of an airplane from the craft itself, comprising means responsive to variations in cosmic ray intensity, means for automatically recording the response of said first-mentioned means, a continuously moving strip of paper adapted to be impressed in equal time intervals with the record thus made, and means for resetting the automatic recording means back to zero position at the end of each of said time intervals.

RUDOLF GEBAUER.